(12) United States Patent
Hayashi et al.

(10) Patent No.: US 8,619,250 B2
(45) Date of Patent: Dec. 31, 2013

(54) ROTARY LASER EMITTING APPARATUS

(75) Inventors: Kunihiro Hayashi, Itabashi-ku (JP);
Fumihiko Kamizono, Itabashi-ku (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 649 days.

(21) Appl. No.: 12/815,657

(22) Filed: Jun. 15, 2010

(65) Prior Publication Data

US 2010/0321673 A1    Dec. 23, 2010

(30) Foreign Application Priority Data

Jun. 17, 2009 (JP) ................. 2009-143901

(51) Int. Cl.
*G01B 11/26* (2006.01)
(52) U.S. Cl.
USPC .............. 356/139.01; 356/3.01; 356/4.01; 356/5.01
(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 6,016,455 | A | 1/2000 | Ohtomo et al. |
| 6,756,581 | B2 | 6/2004 | Ohtomo et al. |
| 7,319,515 | B2 | 1/2008 | Ohtomo et al. |
| 7,894,042 | B2 * | 2/2011 | Turner et al. ................. 356/4.01 |
| 2008/0074638 | A1 * | 3/2008 | Sakimura et al. ............ 356/4.01 |

FOREIGN PATENT DOCUMENTS

| JP | 9-229686 | 9/1997 |
| JP | 11-236717 | 8/1999 |
| JP | 00/22380 | 4/2000 |
| JP | 2002-168625 | 6/2002 |
| JP | 2002-527729 | 8/2002 |
| JP | 2006-71545 | 3/2006 |
| JP | 2007-271627 | 10/2007 |

* cited by examiner

*Primary Examiner* — Luke Ratcliffe
(74) *Attorney, Agent, or Firm* — Wenderoth, Lind & Ponack, L.L.P.

(57) ABSTRACT

A rotary laser emitting apparatus includes a rotary body, a foundation configured to rotatably support the rotary body about an axis, a laser light emitting section contained in the rotary body and configured to emit laser light in a direction orthogonal to a rotation axis of the rotary body, a relative slope detecting mechanism configured to detect an amount of deviation of the rotation axis of the rotary body from the axis of the foundation as a relative slope signal, and a transmitting section configured to transmit the relative slope signal detected by the relative slope detecting mechanism.

13 Claims, 8 Drawing Sheets

ROTARY LASER EMITTING APPARATUS

CROSS REFERENCE TO RELATED APPLICATION

The present application is based on and claims priority from Japanese Patent Application No. 2009-143901, filed on Jun. 17, 2009, the disclosure of which is hereby incorporated by reference in its entirety.

BACKGROUND OF THE INVENTION

1. Field of the Invention

The present invention relates to a rotary laser emitting apparatus which emits laser light while rotating.

2. Description of the Related Art

For example, in surveying work in association with civil engineering work or the like, it is well known that a rotary laser emitting apparatus which emits laser light while rotating about a rotation axis and a receiver which receives the emitted laser light are used to measure a height and a slope angle of a light receiving position against a plane orthogonal to the rotation axis based on signals of the laser light received by the receiver. Such a rotary laser emitting apparatus usually has a structure such as a laser emitting section which is rotatably provided on a foundation and emits the laser light in a direction orthogonal to the rotation axis. In order to heighten the accuracy of the measurement, the rotary laser emitting apparatus is expected to control or suppress an occurrence of shake of the emitted laser light in relation to the rotation axis as much as possible.

As such a rotary laser emitting apparatus, a structure is proposed such that a rotary body is provided rotatably about a rotation axis on a foundation; two or more pentaprisms stacked up on the rotation axis are contained in the rotary body; and a laser light source which emits the laser light to the pentaprisms along the rotation axis is fixedly-provided on the foundation (for example, as shown in Japanese Patent Application Publication No. 2006-71545). In such a rotary laser emitting apparatus, each of the pentaprisms is rotated by the rotary body being rotated on the foundation, and the laser light emitted from the laser light source is emitted so as to pass through each of the rotary pentaprisms; therefore, the laser light is emitted while rotating. In such a rotary laser emitting apparatus, the occurrence of shake caused from an oscillation by the rotation or the like is controlled by a function of the pentaprisms, each of which deflects the entered light beam in a direction orthogonal to the entered direction and emits the deflected light beam, despite a change in attitude.

Incidentally, in such a rotary laser emitting apparatus, when another measurement device (such as a receiver for GPS or the like) is provided on top of the pentaprisms, that is, on top of the rotary body, the measurement device is properly rotated along with the rotary body. Therefore, a structure is proposed in which a fixed cylinder is provided around the rotary body; the rotary body is rotated in the fixed cylinder; and a position for mounting the other measurement device is provided on top of the fixed cylinder. However, in this case, a vertically continued part is necessary on the fixed cylinder. Here, however, it is preferable for the rotary laser emitting apparatus to be configured to emit the laser light over the whole circumference in the rotating direction of the rotary body in terms of heightening the accuracy of the measurement along with heightening the convenience of the measurement.

Therefore, instead of the structure in which such a fixed cylinder is provided, a structure may be proposed in which a supporting shaft portion extending along the rotation axis of the laser emitting section is provided on the foundation and also a through-hole through which the supporting shaft portion is led is provided on the rotary body; and the position for mounting the other measurement device is provided on top of the supporting shaft portion.

However, in such a structure as described above, it is necessary that the laser light emitting section be contained in the rotary body. Since the laser emitting section is contained in the rotary body rotating around the rotation axis, an attitude or an orientation of the rotary body is prone to shake in relation to an axis of the foundation (the rotation axis of the rotary body deviates from the axis of the foundation). Accordingly, the direction of emitted laser light is also prone to shake, and therefore, the accuracy of measurement degrades.

SUMMARY OF THE INVENTION

The present invention aims to provide a rotary laser emitting apparatus having a higher measurement accuracy even when the laser emitting section is provided in an annular rotary body surrounding the rotation axis and the direction of the laser light emitted from the laser emitting section is subject to shake.

According to an embodiment of the present invention, a rotary laser emitting apparatus is configured to include a rotary body, a foundation configured to rotatably support the rotary body about an axis, a laser light emitting section contained in the rotary body and configured to emit laser light in a direction orthogonal to a rotation axis of the rotary body, a relative slope detecting mechanism configured to detect an amount of deviation of the rotation axis of the rotary body from the axis of the foundation as a relative slope signal, and a transmitting section configured to transmit the relative slope signal detected by the relative slope detecting mechanism.

DETAILED DESCRIPTION OF THE PREFERRED EMBODIMENTS

Hereinafter, a rotary laser emitting apparatus according to preferred embodiments of the present invention will be described in detail with reference to the drawings.

Figure 1:
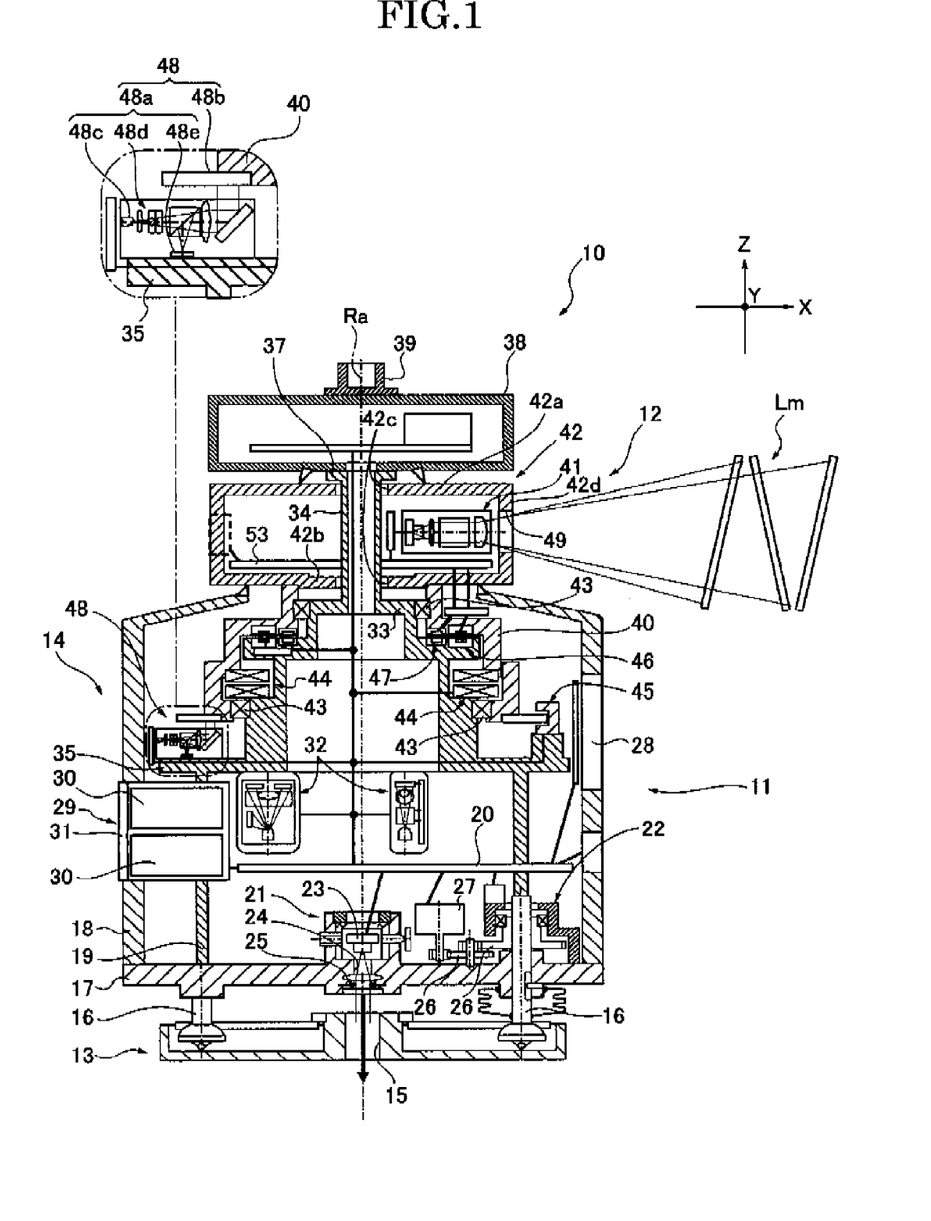
FIG. 1 is a view illustrating a schematic structure of a rotary laser emitting apparatus of the present embodiment.

For example, as shown in FIG. 1, a rotary laser emitting apparatus 10 according to an embodiment of the present invention includes a rotary body 12, a foundation 11 configured to rotatably support the rotary body 12 about an axis Ra, a laser light emitting section 41 contained in the rotary body 12 and configured to emit laser light in a direction orthogonal to a rotation axis of the rotary body 12, a relative slope detecting mechanism 48 such as a slope sensor configured to detect an amount of deviation of the rotation axis of the rotary body 12 from the axis Ra of the foundation 11 as a relative slope signal, and a transmitting section 47 configured to transmit the relative slope signal detected by the relative slope detecting mechanism 48.

Figure 2:
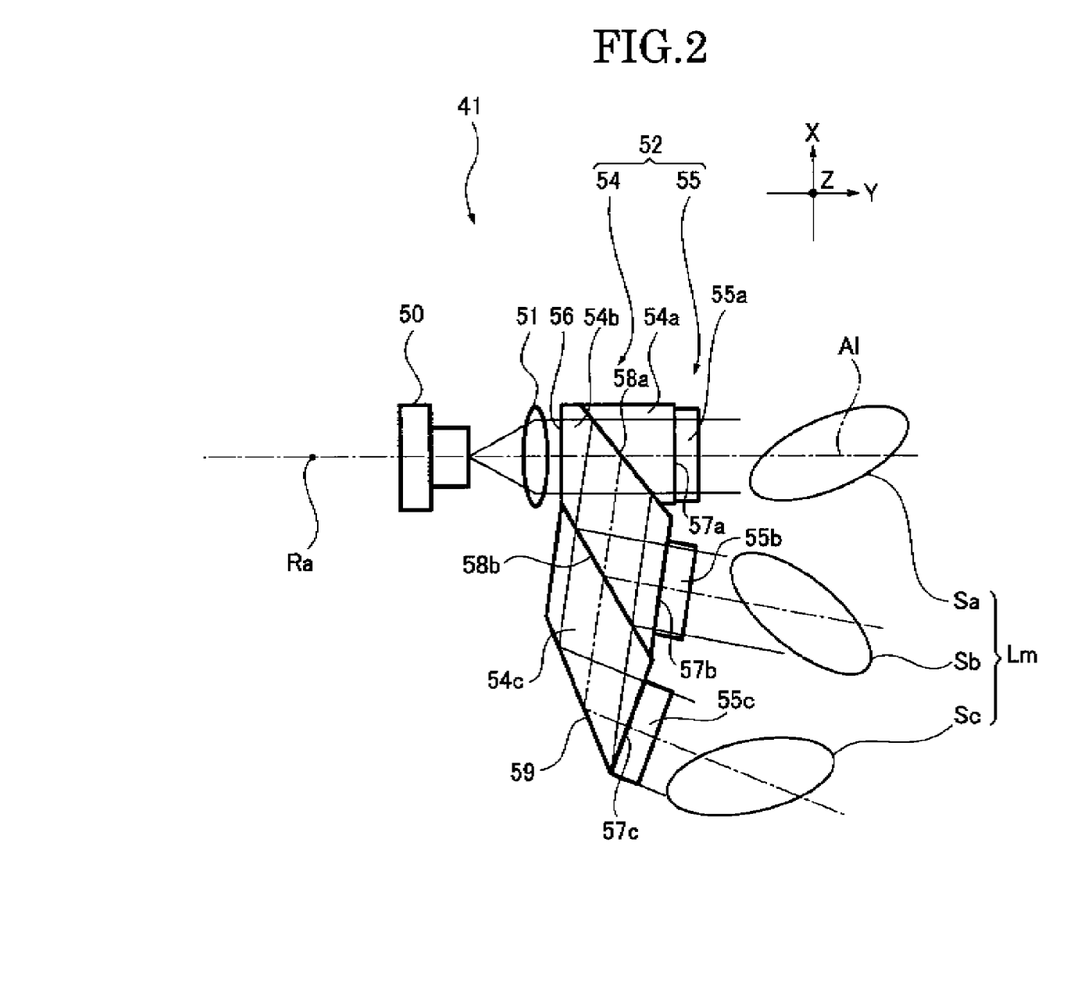
FIG. 2 is a top view of a laser emitting section viewed in a direction of an axis.

The laser light emitting section 41 may have a laser light source 50, for example, a laser diode, as shown in FIG. 2.

Example

The relative slope signal may be superimposed on the laser light by Phase Shift Keying system.

Figure 3A:
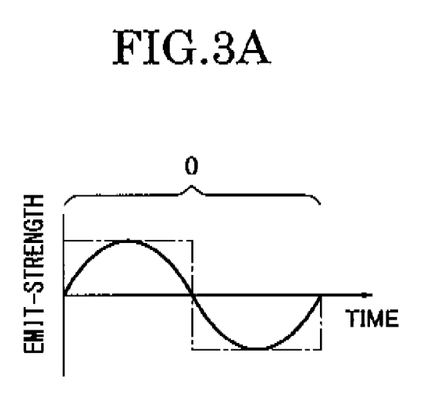
FIG. 3A is a view illustrating a superimposition of data on a mensurative laser beam Lm by using a Phase Shift Keying system, indicating a signal of "0".
Figure 3B:
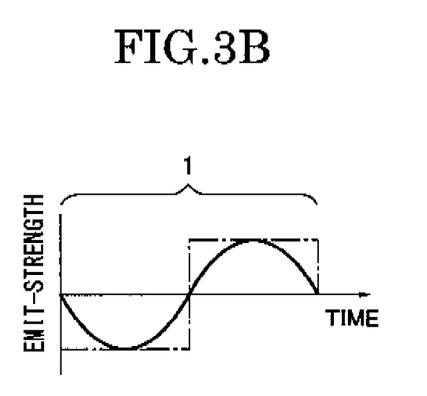
FIG. 3B is a view illustrating a superimposition of data on a mensurative laser beam Lm by using a Phase Shift Keying system, indicating a signal of "1".
Figure 4A:
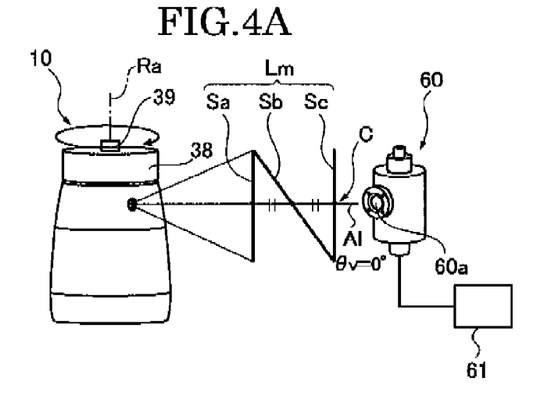
FIG. 4A is a view of a survey by using the rotary laser emitting apparatus when height-positions of the rotary laser emitting apparatus and a light receiver are the same.
Figure 4B:
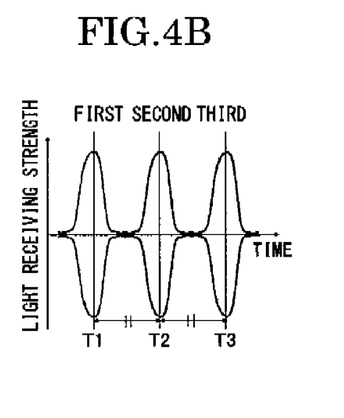
FIG. 4B is a view of a survey by using the rotary laser emitting apparatus, showing a shape of signals of the laser light received by the light receiver under the circumstances of FIG. 4A.
Figure 4C:
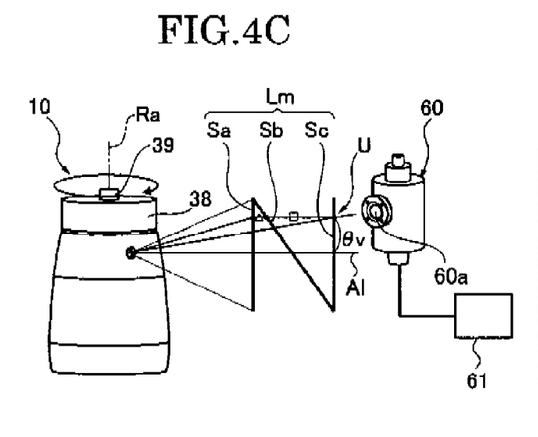
FIG. 4C is a view of a survey by using the rotary laser emitting apparatus 10 when a height-position of the light receiver 60 is higher than that of the rotary laser emitting apparatus.
Figure 4D:
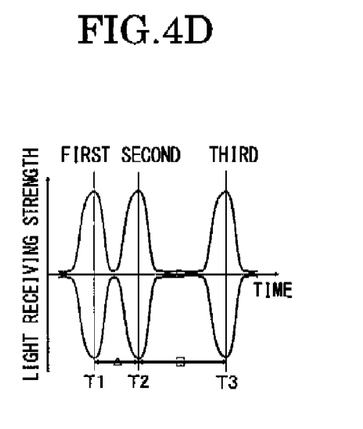
FIG. 4D is a view of a survey by using the rotary laser emitting apparatus, showing a shape of signals of the laser light received by the light receiver under the circumstances of FIG. 4C.
Figure 5:
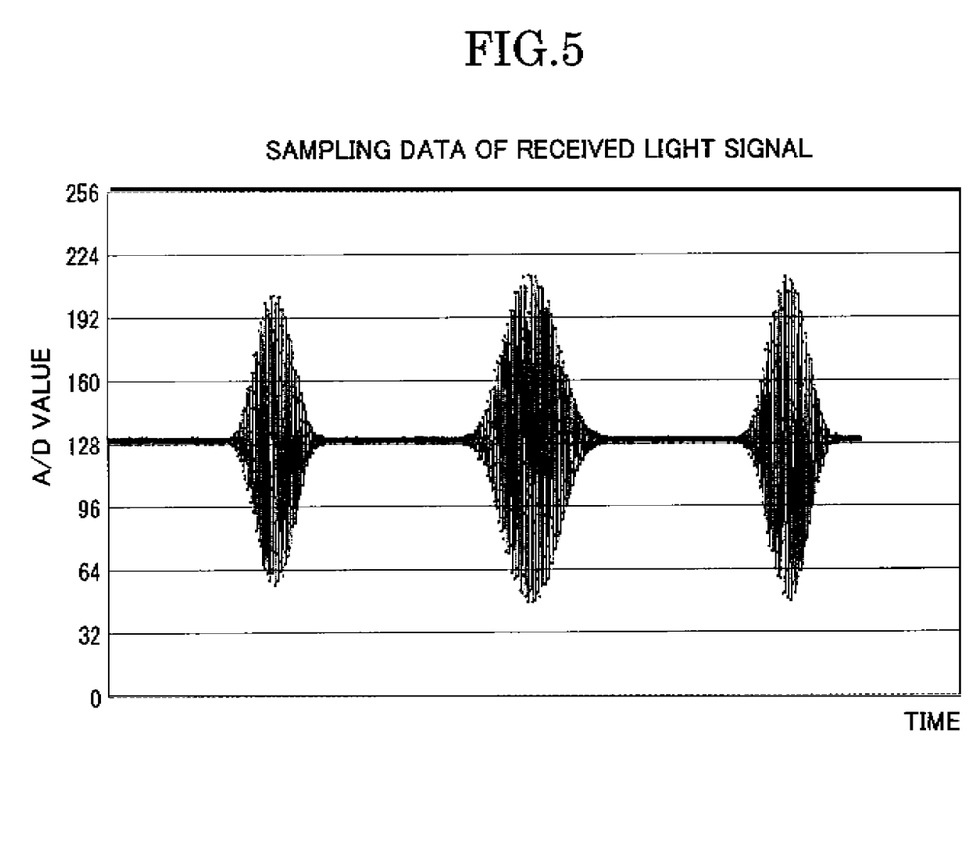
FIG. 5 is an explanatory view showing an example of the received
Figure 6:
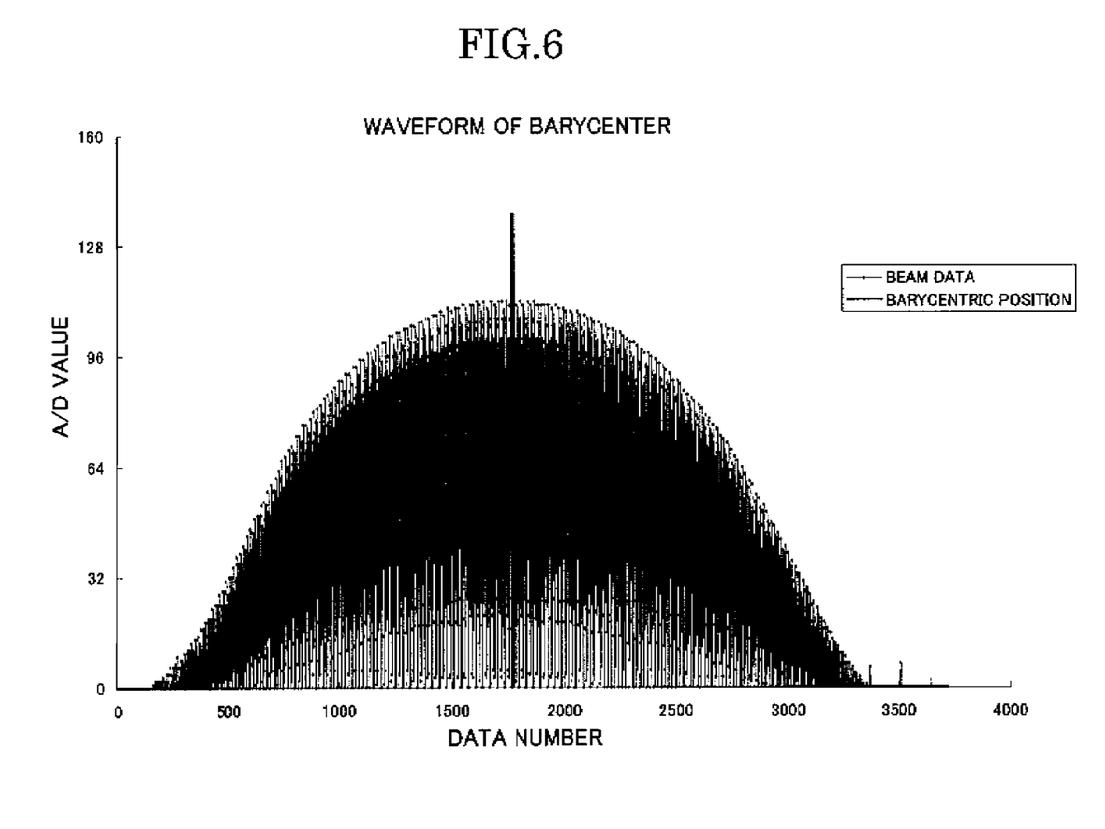
FIG. 6 is a view illustrating a calculation of the barycentric position on the received signal.

FIG. 1 illustrates a schematic structure of the rotary laser emitting apparatus 10 of the present embodiment. FIG. 2 illustrates a top view of the laser emitting section 41 viewed in a direction of the axis Ra when the rotating axis of the rotary body 12 is on the axis. FIG. 3A illustrates a superimposition of data on a laser beam Lm by using a Phase Shift Keying system, indicating a signal of "0". FIG. 3B illustrates a superimposition of data on a laser beam Lm by using a Phase Shift Keying system, indicating a signal of "1". FIG. 4A illustrates a schema of the survey by using the rotary laser emitting apparatus 10 and a receiver 60 configured to receive laser light emitted from the rotary laser emitting apparatus 10 when height-positions of the rotary laser emitting apparatus and the light receiver 60 are the same. FIG. 4B illustrates a schema of the survey by using the rotary laser emitting apparatus 10 and the receiver 60, and shows a shape of the signals of the laser light received by the light receiver 60 under the circumstances of FIG. 4A. FIG. 4C illustrates a schema of the survey by using the rotary laser emitting apparatus 10 when a height-position of the light receiver 60 is higher than that of the rotary laser emitting apparatus 10. FIG. 4D illustrates a schema of the survey by using the rotary laser emitting apparatus 10, and shows a shape of the signals of the laser light received by the light receiver 60 under the circumstances of FIG. 4C. FIG. 5 is an example of the signals of the received laser light. FIG. 6 illustrates a calculation of the barycentric position of the received signals.

As shown in FIG. 1, the rotary laser emitting apparatus 10 includes the rotary body 12 being rotatably supported on the foundation 11. The rotary laser emitting apparatus 10 is positioned on a given point on a survey, and emits the mensurative laser beam Lm as the laser light while rotating at a constant velocity.

The foundation 11 is a ground portion for when positioning the rotary laser emitting apparatus 10 on the given point, and includes a base portion 13 and a case 14 disposed at the upper side of the base portion 13. The base portion 13 is a portion on which a not-illustrated leg portion is positioned for mounting the rotary laser emitting apparatus 10. The base portion 13 is in a generally plate-like form, and has an irradiation hole 15 for positioning, which is positioned at a center thereof. The base portion 13 supports the case 14 with three screws 16 (only two screws are shown in FIG. 1) positioned at three points surrounding the irradiation hole 15 being equally spaced from each other. Among the three screws, one is fixed to the case 14, and the other two are screwed on the case 14 with a changeable screw amount for adjusting height and slope.

The case 14 includes a discoid bottom wall portion 17 on which each of the screws 16 is screwed, a cylindrical outer wall portion 18 forming an outer shape along with the bottom wall portion 17, and an interior cylindrical portion 19 positioned on the bottom wall portion 17 and inside of the outer wall portion 18.

A main board 20 is contained in the case 14 and has a function as a controlling section. The main board 20 is electrically connected to parts being electrically-driven, and the controlling section overall controls the performance of the electrically-driven parts.

In the case 14, a positioning irradiation mechanism 21 and a level adjusting mechanisms 22 are provided on the bottom wall portion 17. The positioning irradiation mechanism 21 forms an irradiation spot on the axis of the foundation 11 and the level adjusting mechanisms 22 adjusts a slope of the case 14. The positioning irradiation mechanism 21 and the level adjusting mechanisms 22 run in accordance with an operation made by an operation portion (not illustrated) under the control of the above-described controlling section 20.

The positioning irradiation mechanism 21 is provided at the center of the bottom wall portion 17, and has an irradiation source 23, a through-hole 24 and a collimator lens 25. The positioning irradiation mechanism 21 is configured to emit laser light from the irradiation source 23 such that the emitted laser light passes through the through-hole 24, the collimator lens 25, and then the irradiation hole 15 provided on the base portion 13 to form an irradiation spot (not illustrated) which is used for indicating a reference position for positioning the rotary laser emitting apparatus 10 at a mounting position on a mounting surface. An axis of the laser light irradiated by the positioning irradiation mechanism 21 is aligned with an axis of the foundation 11 (of the case 14), that is, the axis Ra as described below. Therefore, the rotary laser emitting apparatus 10 may be easily positioned at the given point by using the irradiation spot (not illustrated) formed by the positioning irradiation mechanism 21.

The level adjusting mechanisms 22 adjusts a slope of the case 14, that is, a slope of the bottom wall portion 17 in relation to the base portion 13, and is provided corresponding to the two screws 16 (one is not illustrated) which are screwed with changeable screwed amount. The level adjusting mechanisms 22 has a structure in which a level adjusting motor 27 is connected to the screws 16 via a gear 26 and by driving the level adjusting motor 27, the screws 16 are rotated to adjust the screwed amount of the screws 16 on the bottom wall portion 17. Therefore, by properly modifying the screwed amount of the two screws 16 (one of them is not illustrated), the slope of the bottom wall portion 17, that is, the slope of the case in relation to the base portion 13 is adjusted. In addition, the rotary laser emitting apparatus 10 includes a pair of tilt sensors 32 as described below. In the present embodiment, the above-described controlling section 20 obtains an absolute slope signal detected by the pair of tilt sensors and the level adjusting mechanism 22 is automatically driven such that an output from the pair of tilt sensors 32 indicates a horizontal state under the control of the controlling section 20. For this reason, the level adjusting mechanisms 22 and the pair of tilt sensors 32 function as an automatic adjusting mechanism.

Further, in the case 14, a panel display 28 and a battery storage portion 29 are provided on the outer wall portion 18. The panel display 28 displays the information about the rotary laser emitting apparatus 10, and is operated under the control of the controlling section 20. The battery storage portion 29 is a space where a battery 30 is stored for an electric power supply within the rotary laser emitting apparatus 10, and is covered by an openable and closable cover plate 31.

The absolute slope detecting mechanism such as the pair of tilt sensors 32 is provided in the foundation 11 and configured to detect a slope of the axis of the foundation 11 in relation to a horizontal plane as an absolute slope signal, and the transmitting section 47 such as a data transferring mechanism transmits the absolute slope signal detected by the absolute slope detecting mechanism 32 simultaneously with the relative slope signal.

In the case 14, the pair of tilt sensors 32 is provided in the interior cylindrical portion 19. The pair of tilt sensors 32 detects a slope of the interior cylindrical portion 19 in relation to the horizontal plane, that is, an absolute slope of the foundation 11 (an absolute slope of the interior cylindrical portion 19 itself) under the circumstances where the rotary laser emitting apparatus 10 is positioned on the given point for a survey. One tilt sensor is configured to detect a tilt about an X-axis; and the other tilt sensor is configured to detect a tilt about a Y-axis. Therefore, the pair of tilt sensors 32 function as the absolute slope detecting mechanism which is configured to detect a slope of the foundation 11 in relation to the horizontal plane. The pair of tilt sensors 32 outputs the detected absolute slope signal to the controlling section 20 and also to a drive control board 53 as described below by the data transferring mechanism 47 as described below.

The rotary laser emitting apparatus 10 may include a wireless communication device 38. The transmitting section 47 may transmit the relative slope signal by the wireless communication device 38.

The interior cylindrical portion 19 has a cylindrical shape overall as described above, and includes a supporting shaft portion 34 (included in the foundation) extending from an upper wall portion 33 located at the upper side of the interior cylindrical portion 19, and also includes a flange portion 35 provided at an intermediate position of the interior cylindrical portion 19. The supporting shaft portion 34 has a cylindrical shape, extending along an axis line (aligned to the axis Ra as described below) from the intermediate position of the upper wall portion 33. An upper portion of the supporting shaft portion 34 is a mount portion 37 on which in the present embodiment a wireless unit 38 is mounted; and further, an adapter 39 is mounted on top of the wireless unit 38 for attaching, for example, a GPS receiving terminal (not illustrated). Electric wires and the like are led through the supporting shaft portion 34 to connect the wireless unit 38 to the main board 20.

The flange portion 35 has a flat upper surface to determine a reference plane Bp to be orthogonal to the axis line, and the flange portion 35 is extended from the intermediate position of the interior cylindrical portion 19 to be orthogonal to the axis line (the axis Ra). In the interior cylindrical portion 19, when the slope is not detected by the pair of tilt sensors 32, the reference plane Bp determined by the flange portion 35 is set to be parallel to the horizontal plane.

The rotary body 12 is rotatably supported on the interior cylindrical portion 19. The rotary body 12 includes a base section 40 supported on the interior cylindrical portion 19 and a containing section 42 containing a laser emitting section 41.

The base section 40 has a cylindrical shape, fitting into the upper shape of the interior cylindrical portion 19, and is supported on the interior cylindrical portion 19 rotatably about the axis line of the interior cylindrical portion 19 via a bearing member 43. Therefore, the axis line of the interior cylindrical portion 19 is the axis Ra of the rotary body 12, that is, of the base section 40.

In a space between the base section 40 and the interior cylindrical portion 19, a direct drive motor (hereinafter DD motor 44), an encoder 45, an electric power transferring mechanism 46, the data transferring mechanism 47, and the slope sensor 48 are provided. The base section 40 rotates on the interior cylindrical portion 19 as the DD motor 44 is driven. The encoder 45 is provided to detect a relative rotation velocity and rotation amount. The electric power is supplied by the electric power transferring mechanism 46 such that the data is exchanged between the base section 40 and the interior cylindrical portion 19 by the data transferring mechanism 47 even while rotating as described above.

The relative slope detecting mechanism may be provided between the rotary body 12 and the foundation 11.

The transmitting section may include the laser light source 50 of the laser emitting section 41 and a drive controlling section 53 configured to control the laser light source 50 in accordance with the relative slope signal so as to superimpose the relative slope signal on the laser light emitted from the laser emitting section 41 while the rotary body 12 is rotated.

The slope sensor 48 is provided to detect the slope of the base section 40 in relation to the interior cylindrical portion 19. The slope sensor 48 includes a sensor main unit 48a and a reflecting mirror 48b. The sensor main unit 48a is provided on the reference plane Bp determined by the flange portion 35. The reflecting mirror 48h is provided to oppose to the sensor main unit 48a (the reference plane Bp) on the bottom of the base section 40. When the axis line of the rotary body 12 (of the base section 40) is aligned to the axis Ra, the reflecting mirror 48b is set such that a reflecting surface of the reflecting mirror 48b is to be parallel to the reference plane Bp. The sensor main unit 48a includes a sensor light source 48c, a sensor optical system 48d, and a sensor receiving section 48e. The sensor main unit 48a emits detection light, which is emitted from the sensor light source 48c and then passes through the sensor optical system 48d as a parallel light flux along the orthogonal direction to the reference plane Bp (the direction along the axis Ra). The detection light is reflected by the reflecting surface of the reflecting mirror 48b opposing the sensor main unit 48a (the reference plane Bp), again enters the sensor main unit 48a, is guided to the sensor receiving section 48e via the sensor optical system 48d and then is received by the sensor receiving section 48e. In the sensor receiving section 48e, supposing a position (referred to as "receiving position") where the detection light reflected by the reflecting surface of the reflecting mirror 48b is received is set to be a reference position when the reflection surface of the reflection mirror 48b is parallel to the reference plane Bp, a displacement amount and a displacement direction from the reference position to the receiving position change according to the slope of the reflecting surface of the reflecting mirror 48h in relation to the reference plane Bp. Accordingly, in the slope sensor 48, the slope of the base section 40 in relation to the interior cylindrical portion 19, that is, the relative slope of the rotation body 12 in relation to the foundation 11 is detected by the receiving position of the light at the sensor receiving section 48e. Here, since the axis Ra is determined by the foundation 11, the slope sensor 48 functions as the relative slope detecting mechanism which detects an amount of deviation of the rotation axis of the rotary body 12 from the axis Ra as a relative slope signal. The slope sensor 48 outputs the detected relative slope signal to the drive control board 53 as described below by the data transferring mechanism 47.

The containing section 42 is fixed on top of the base section 40 which is to be rotated on the interior cylindrical portion 19. The containing section 42 has a hollow cylindrical form, and a through-hole 42c along the axis line is provided at the central portion (close to the axis line) of an upper wall portion 42a and a bottom wall portion 42h. In the containing section 42, in the circumstances where the base section 40 is rotatably supported on the interior cylindrical portion 19, the supporting shaft portion 34 extending from the interior cylindrical portion 19 is led through the through-hole 42c, and the upper portion of the supporting shaft portion 34 (the mount portion 37) extrudes from the upper wall portion 42a. Therefore, even when the containing section 42 is rotated on the interior cylindrical portion 19 with the base section 40, it is possible to keep the mount portion 37 still without being rotated with the containing section 42, that is, with the rotation body 12, and to stably support other survey units (the wireless unit 38 in this example) on top of the containing section 42, that is, of the laser emitting section 41 contained therein.

The laser emitting section 41 is configured to emit laser light from an emitting aperture 49 provided on a side-wall surface 42d of the containing section 42. Therefore, the rotary laser emitting apparatus 10 can emit laser light (the mensurative laser beam Lm) over the whole circumference about the axis Ra by the rotation body 12 rotated on the interior cylindrical portion 19.

The laser emitting section 41, as shown in FIG. 1 and FIG. 2, includes a semiconductor laser diode (hereinafter LD 50), a collimator lens 51, and a beam forming optical system 52. An emitted light axis AI of the laser emitting section 41 is set to be parallel to the reference plane Bp determined by the flange portion 35 under the circumstances where the axis line of the rotary body 12 is aligned to the axis Ra.

The LD 50 is connected to the drive control board 53 (as shown in FIG. 1) having a function as a drive controlling section of the laser emitting section 41, and emits the laser light on the emitted light axis AI by being driven by the control of the drive controlling section. The collimator lens 51 and the beam forming optical system 52 are provided on the emitted light axis AI.

The laser light emitted from the LD 50 reaches the collimator lens 51. The collimator lens 51 turns the laser light emitted by the LD 50 into the parallel light flux. The laser light turned into the parallel light flux through the collimator lens 51 reaches the beam forming optical system 52.

The beam forming optical system 52 divides the incoming laser light into three beams, and emits each of the divided laser light components so as to form a fan beam. The beam forming optical system 52, as shown in FIG. 2, includes three prism blocks 54a, 54b, 54c for dividing the incoming laser light into three, and three cylindrical lenses 55a, 55b, 55c for forming a fan beam. The beam forming optical system 52 has a structure in which the prism blocks 54a, 54b, and 54c are joined in parallel to the reference plane Bp, and in which the cylindrical lenses 55a, 55b, and 55c are joined with the prism blocks 54a, 54b, and 54c, respectively.

Specifically, in the beam forming optical system 52, the prism block 54b forms an incoming end face 56 which is positioned on the emitted light axis AI, the prism block 54b positioned on the emitted light axis AI forms a first emitting end face 57a, and then a beam splitter 58a is formed by a joint surface between the prism block 54a and the prism block 54b. Further, in a direction in which the light flux on the emitted light axis AI is reflected by the beam splitter 58a, a beam splitter 58b is formed by a joint surface between the prism block 54b and the prism block 54c. In a direction in which the light flux is reflected by the beam splitter 68b, a second radiation end face 57b is formed by the prism block 54b. Furthermore, in a direction in which the light flux which is reflected by the beam splitter 58a and then transmits through the beam splitter 58b is directed, a prism reflecting surface 59 is formed by the prism block 54c and a third radiation end face 57c is formed by the prism block 54c in a direction where the light flux is reflected by the prism reflecting surface 59.

The cylindrical lenses 55 (55a, 55b, and 55c) are provided on the radiation end faces 57a, 57b, and 57c, respectively. Each of the cylindrical lenses 55 is set so as to turn the parallel light flux emitted from each of the radiation end faces 57a, 57b, and 57c into a so-called fan beam, which is a light flux having a narrow beamwidth in one dimension and a wider beamwidth in the other dimension, the wider beamwidth having a fan-like face shape which spreads out widely, as going away from the axis Ra.

Therefore, in the beam forming optical system 52, as the laser light passes the emitted light axis AI and enters the incoming end face 56, the laser light passes through the prism block 54b, reaches the beam splitter 58a, and then is divided into two. One beam of laser light which is transmitted through the beam splitter 58a passes through the prism block 54a, passes through the first radiation end face 57a and then reaches the cylindrical lens 55a. The other laser light beam reflected by the beam splitter 58a passes through the prism block 54b and reaches the beam splitter 58b and is further divided into two. One laser light beam reflected by the beam splitter 58b passes through the prism block 54b, passes through the second radiation end face 57b, and reaches the cylindrical lens 55b. The other laser light beam which is transmitted through the beam splitter 58b passes through the prism block 54c, reaches the prism reflecting surface 59, then is reflected, passes through the third radiation end face 57c and then reaches the cylindrical lens 55c.

In the beam forming optical system 52, the fan beam emitted from the cylindrical lens 55a is turned into an irradiation ray Sa along the axis Ra; the fan beam emitted from the cylindrical lens 55c is turned into an irradiation ray Sc spacing a predefined distance from the irradiation ray Sa along the axis Ra (the irradiation directions of the irradiation rays have a relationship such that they have a predefined angle from each other in a horizontal plane); and the fan beam emitted from the cylindrical lens 55*b* is turned into an irradiation ray Sb which slantingly extends from a top end of one of the irradiation rays Sa and Sc to a bottom end of the other one of the irradiation rays Sa and Sc. The irradiation ray Sa, the irradiation ray Sb, and the irradiation ray Sc form an irradiated mensurative laser beam Lm.

Accordingly, the laser emitting section 41, as shown in FIG. 1, emits the laser light (the mensurative laser beam Lm) from the emit aperture 49 provided on the side-wall surface 42*d* of the containing section 42 of the rotary body 12; and therefore, the rotary laser emitting apparatus 10 emits the laser light (the mensurative laser beam Lm) along the reference plane Bp over the whole circumference about the axis Ra by allowing the laser emitting section 41 to emit the laser light, while the rotation body 12 rotates on the interior cylindrical portion 19.

Here, the mensurative laser beam Lm emitted from the laser emitting section 41 is laser light formed by shaping the laser light emitted from the LD 50 which is driven by the control of the drive controlling section (the drive control board 53). The drive controlling section controls the LD 50 so as to make the frequency of the mensurative laser beam Lm modulable to two or more arbitrary frequencies, and as a result, when two or more rotary laser emitting apparatuses are used at the same time, it is possible to distinguish which rotary laser emitting apparatus of the two or more rotary laser emitting apparatuses emits the received mensurative laser beams Lm from the other two or more rotary laser emitting apparatuses. The drive controlling section (the drive control board 53) controls a driving of the LD 50 so as to emit the laser light (the mensurative laser beam Lm) having a frequency set by operation of a not-illustrated operation portion.

Further, the relative slope signal may be superimposed on the laser light by a Phase Shift Keying system. In the rotary laser emitting apparatus of the present embodiment, the relative slope signal detected by the slope sensor 48 and the absolute slope signal detected by the pair of tilt sensors 32 are superimposed on the mensurative laser beam Lm emitted by the laser emitting section 41. As described above, the relative slope signal from the slope sensor 48 and the absolute slope signal from the pair of tilt sensors 32 enter the drive controlling section (the drive control board 53). The drive controlling section controls the LD 50 so that the obtained relative slope signal and absolute slope signal are superimposed on the mensurative laser beam Lm. In the present embodiment, the drive controlling section controls the LD 50 so that the obtained relative slope signal and absolute slope signal are superimposed by using a Phase Shift Keying System on the mensurative laser beam Lm.

Figure 9A:
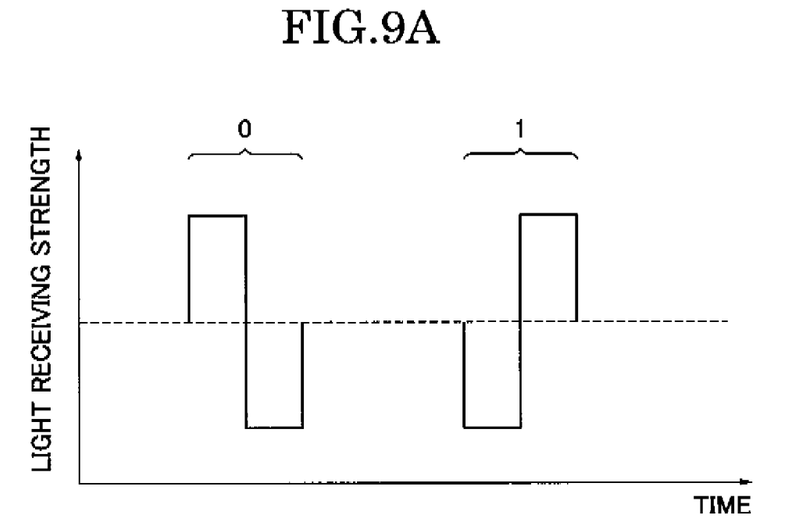
FIG. 9A is a frame format explaining an offset mensurative laser beam Lm and shows the signals indicating "0" and "1" on a received light signal.

Specifically, as shown in FIG. 3A and FIG. 3B, a signal indicating "0" and a signal indicating "1" which are formed by waveforms having a same period which is constant as a reference (a sine wave is illustrated here but a square wave shown by a two-dot chain line in FIGS. 3A and 3B may also be used) and which have a phase shift of 180 degrees to each other are used in the drive controlling section (shown in FIG. 3A, FIG. 3B and FIG. 9A). Here, each signal is an emitting intensity as a function of time. Therefore, regarding the waveforms of the signals for one period, when the emitting intensity of each of the waveforms of the signals of "0" and "1" is integrated with time for one period having a center which is set to a fluctuation center of each emitting intensity, the integrals of the emitting intensities of the signals of "0" and "1" are equal to each other. Accordingly, each of the signals of "0" and "1" for one period corresponds to the same light amount no matter whether the signal is "0" or "1". The drive controlling section converts the obtained relative slope signal and absolute slope signal into data of "0" and "1", and appropriately combines the signals indicating "0" or "1" to control the drive of the LD 50. Since the laser light emitted from the LD 50 is shaped by the collimator lens 51 and the beam forming optical system 52 as described above and is turned into the mensurative laser beam Lm, the laser emitting section 41 emits the mensurative laser beam Lm on which the relative slope signal and the absolute slope signal are superimposed. Therefore, in the present embodiment, the laser emitting section 41 and the drive controlling section (the drive control board 53) function as the transmitting section which is configured to transmit the relative slope signal and the absolute slope signal.

The rotary laser emitting apparatus 10 may be used in a survey system including the receiver 60 configured to receive the laser light emitted from the rotary laser emitting apparatus 10 and a calculation mechanism configured to calculate an angle of elevation between a point where the receiver 60 is positioned and a point where the rotary laser emitting apparatus 10 is positioned based on a signal of the laser light received by the receiver 60. The receiver 60 receives an alternative current signal of the laser light on which the relative slope signal is superimposed. The calculation mechanism is configured to full-wave rectify the received alternative current signal of the laser light and to calculate a barycentric position of the rectified received signals.

The survey by using the rotary laser emitting apparatus 10 is described with reference to FIG. 4A to FIG. 4D. At the survey, the rotary laser emitting apparatus 10 is positioned at the given point under the circumstances where no slope is detected by the pair of tilt sensors 32, and the light receiver 60 is positioned at the surveying points. The light receiver 60 has a structure which outputs the detected signal of the received light to a calculation mechanism 61. In the present embodiment, the light receiver 60 includes a Si photodiode and an aspheric lens having a directivity of ±10-degree. Once light passing through the aspheric lens enters a light receiving surface of the Si photodiode, the light receiver 60 outputs an electric signal corresponding to the light amount, that is, the signal of the received light to the calculation mechanism 61. The calculation mechanism 61 calculates an angle of elevation for the survey based on the signal of the incoming received light. The calculation mechanism 61 may be mounted on the inside of the light receiver 60, or may also be mounted on the outside of the light receiver 60 by being electrically connected. On the survey, a position of the surveying point may be surveyed based on the rotary laser emitting apparatus 10 by precisely measuring a time interval of the signals of the received light output from the light receiver 60. Therefore, the rotary laser emitting apparatus 10 and the light receiver 60 and the calculation mechanism 61 function as a survey system.

For example, as shown in FIG. 4A, viewed in a height direction (Z axis direction), when a center position of a light receiving portion 60*a* of the light receiver 60 is completely aligned to the emitting position (the emitted light axis AI) of the rotary laser emitting apparatus 10, the light receiver 60 receives the light of the center position C viewed in the height direction on the mensurative laser beam Lm. Then, as shown in FIG. 4B, the signals of the received light corresponding to the irradiation ray Sa, the irradiation ray Sb, and the irradiation ray Sc are output from the light receiver 60 with equal intervals.

On the other hand, as shown in FIG. 4C, when the center position of the light receiving portion 60*a* of the light receiver 60 locates at an upper position by θv than the emitting position (the emitted light axis AI) of the rotary laser emitting apparatus 10, the light receiver 60 receives the light of the θv-degree upper position U on the mensurative laser beam Lm in the height direction. Then, as shown in FIG. 4D, the signals of the received light corresponding to the irradiation ray Sa, the irradiation ray Sb, and the irradiation ray Sc are output from the light receiver 60 with differences in time according to intervals on the upper position U.

Accordingly, the survey system as described above may precisely calculate the angle of elevation at the positioned point where the light receiver 60 is positioned in relation to the given point where the rotary laser emitting apparatus 10 is positioned by precisely measuring the time intervals of the signals of the received light output from the light receiver 60, and may precisely survey the surveying points by calculating a distance and a directionality between the given point and the positioned points. According to the manner as described above, the calculation mechanism 61 calculates the angle of elevation at the positioned point where the light receiver 60 is positioned in relation to the given point where the rotary laser emitting apparatus 10 is positioned based on the signal of the light received from the light receiver 60, and calculates the survey value of the surveying points.

Here, as shown in FIG. 5, the light receiver 60 obtains a plurality of values (the light amounts) of A/D values as the signals of the received light corresponding to the irradiation ray Sa, Sb, and Sc, which change up and down around 130 of A/D value. This is because a predefined sampling cycle for receiving the mensurative laser beam Lm is set in the light receiver 60, and the light receiver 60 outputs the received value as a digital value (A/D conversion) according to the predefined cycle. Further, the signals of the light received by the light receiver 60 are included in some of groups of values, and the amplitude in the group of values gradually increases then gradually decreases. This is because the light receiver 60 outputs the value proportional to the light amount of the received light and since the mensurative laser beam Lm is emitted from the rotating rotary laser emitting apparatus 10, the output values are the largest when the center position of the light receiving portion 60a completely faces the laser emitting section 41 (emit aperture 49) of the rotary laser emitting apparatus 10; and the output values gradually decrease as an angle of between the center position of the light receiving portion 60a and the laser emitting section 41 deviates from each other in the vicinity of the situation where the center position of the light receiving portion 60a completely faces the laser emitting section 41. Therefore, in the calculation mechanism 61, the precise time intervals between the irradiation ray Sa, the irradiation ray Sb, and the irradiation ray Sc are calculated by detecting a barycentric position on each of the three groups of the signals of the light received from the light receiver 60 (as shown in FIG. 6). Regarding the method for detecting a barycentric position by a group of the values, a detailed description is omitted since it has been already known.

Figure 7:
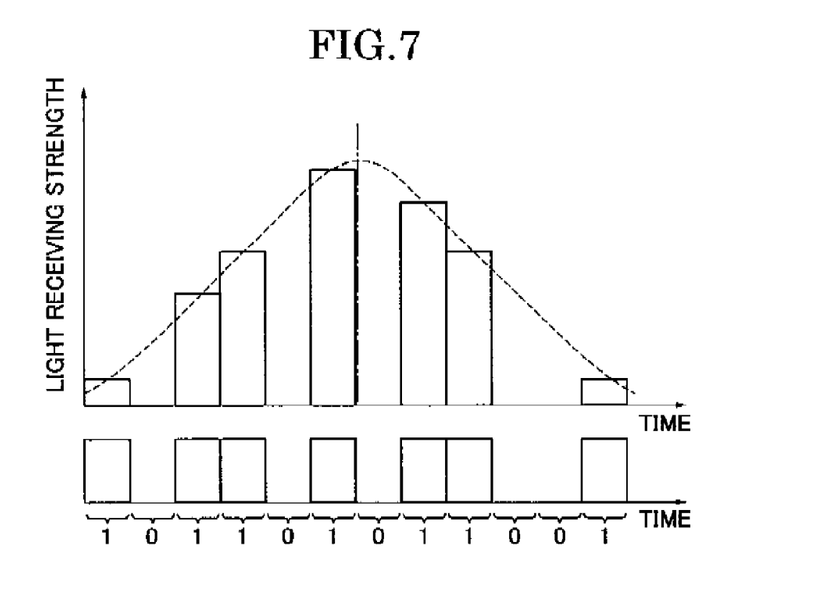
FIG. 7 shows explanatory views illustrating problems at superimposing data. The upper view shows a frame format of a transition of a light signal received from a light receiving portion (the light amount received at the light receiving portion). The lower view shows a frame format of the transition of the amount of the laser light emitted as the mensurative laser beam. Horizontal axes of the upper and lower views are indicated with an equal time to each other.

Next, a problem in superimposing the relative slope signal and the absolute slope signal on the mensurative laser beam Lm is explained with reference to FIG. 7. FIG. 7 explains the problem by showing an upper view and a lower view with time on horizontal axes corresponding to each other. The upper view schematically shows a transition of the signals of the light received from the light receiving portion (the light amount received at the light receiving portion). The lower view schematically shows a transition of the light amount of the laser light emitted as the mensurative laser beam. In addition, in the upper view of FIG. 7, a dashed line shows the transition of the signals from the light receiving portion when receiving the rotating mensurative laser beam emitted as laser light having a constant intensity. A two dotted line shows the barycentric position. The transition of the signals of the received light indicted with the dashed line shows an ideal transition in perspective of calculating the barycenter, and hereinafter it is called an ideal line.

For example, the drive controlling section, in the same manner as the rotary laser emitting apparatus 10 of the present embodiment as described above, converts the obtained relative slope signal and the absolute slope signal into the data of "0" and "1", and controls the LD so as to combine appropriately the signals indicating "0" or "1" according to the data. Here, as shown in the lower view of FIG. 7, the problem is that the drive controlling section makes the light amount of the mensurative laser beam Lm zero (stop emitting the laser light from the LD 50) as a signal indicating "0", and makes the light amount of the mensurative laser beam Lm the largest as a signal indicating "1".

In this case, on the upper view of FIG. 7, while the value along the ideal line indicated with the dashed line is shown on a position where the signal indicates "1", the value (received light amount) of zero is shown on a position where the signal indicates "0". Therefore, (a part of information on the relative slope signal and the absolute slope signal may be obtained on the position where the signal indicates "0". However, the information on the mensurative laser beam is not obtained. Therefore, when a barycentric position is calculated based on the signals of the received lights, the calculated result is different from a primary barycentric position (indicated by a two-dotted line) so that the precise barycenter may not be calculated. As described above, when the precise barycentric position on each of the three groups of the signals of the received light is not detected, the precise time interval between the three irradiation rays cannot be calculated, and therefore, the angle of elevation between the points where the light receivers are positioned and the given point where the rotary laser emitting apparatus is positioned may not be precisely calculated so that the precise survey result may not be obtained.

Figure 8:
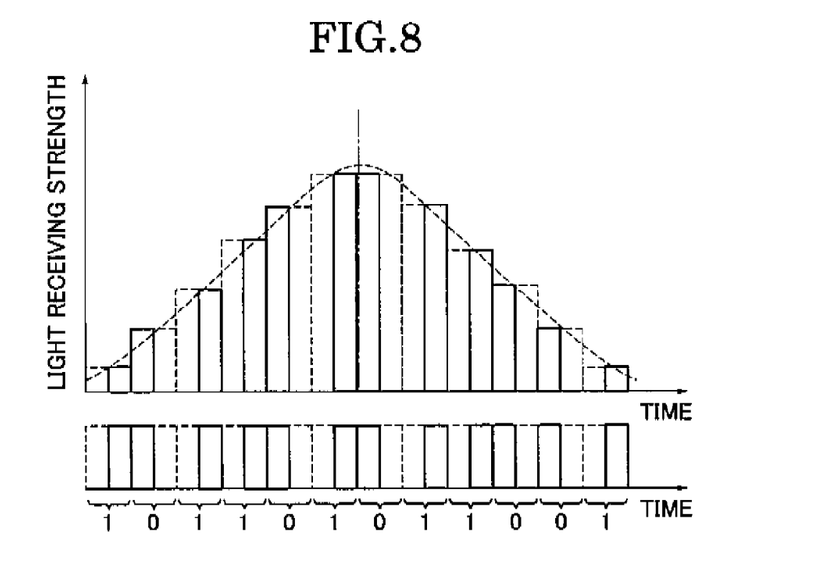
FIG. 8 shows explanatory views for explaining the function of the rotary laser emitting apparatus. Similarly to FIG. 7, the upper view shows a frame format of a transition of a light signal received from a light receiving portion (the light amount received at the light receiving portion). The lower view shows a frame format of the transition of the amount of the laser light emitted as the mensurative laser beam. Horizontal axes of the upper and lower views are indicated with an equal time to each other.
Figure 9B:
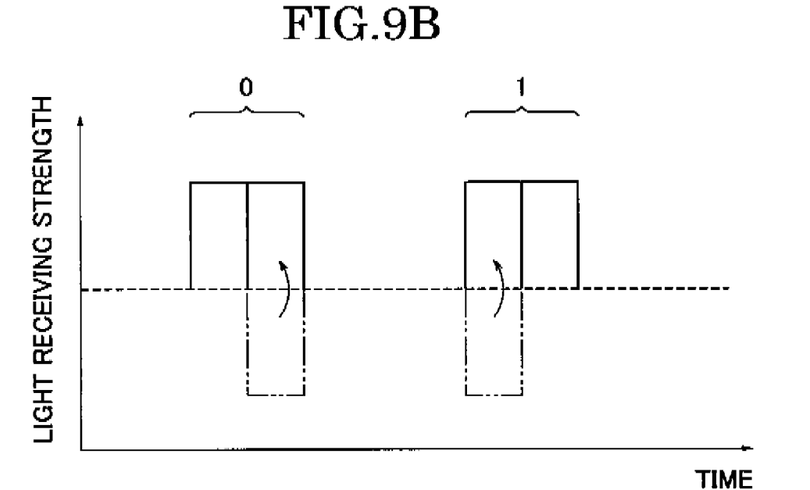
FIG. 9B is a frame format explaining an offset mensurative laser beam Lm and shows a full-wave rectified value.

Next, operations of the rotary laser emitting apparatus 10 of the present embodiment are described with reference to FIG. 8, FIG. 9A and FIG. 9B. Similarly to FIG. 7, FIG. 8 shows an upper view and a lower view with time on the horizontal axes corresponding to each other for explaining the operation of the rotary laser emitting apparatus 10. The upper view schematically shows a transition of the signals of the light received from the light receiving portion (the light amount received at the light receiving portion). The lower view schematically shows a transition of the light amount of the laser light emitted as the mensurative laser beam. FIG. 9A and FIG. 9B are explanatory views schematically showing an offset mensurative laser beam Lm. FIG. 9A shows the signals indicating "0" and "1" on the signals of the received light. FIG. 9B shows full-wave rectified values.

In the rotary laser emitting apparatus 10 of the present embodiment, the relative slope signal and the absolute slope signal are superimposed on the mensurative laser beam Lm by using a Phase Shift Keying system as described above, and have the same integral value each other for one period. Therefore, for example, in the same way as described above, when the signal indicating "0" or "1" is formed by controlling the LD 50 to blink, as shown in the lower view of FIG. 8, an output which changes from zero to the maximum value is a signal indicating "1", and an output which changes from the maximum value to zero is a signal indicating "0". Here, on the mensurative laser beam Lm, either a signal indicating "0" or a signal indicating "1" certainly includes a lighting time period for one period showing one signal, and therefore, it may be prevented from missing the information on the mensurative laser beam Lm so that it is possible to calculate the precise barycentric position (as shown in the upper view of FIG. 8). In this case, the superimposed relative slope signal and absolute slope signal may be easily obtained by judging in the calculation mechanism 61 that if the value on the signals of the received light changes from zero to the maximum value, the signal indicates "1", and that if the value changes from the maximum value to zero, the signal indicates "0".

Therefore, the rotary laser emitting apparatus 10 makes the receiver obtain the information on the mensurative laser beam Lm, and also transmits the information on the relative slope signal and the absolute slope signal by making the receiver receive the emitted rotating mensurative laser beam Lm.

Furthermore, the rotary laser emitting apparatus 10 of the present embodiment offsets the mensurative laser beam Lm emitted from the laser emitting section 41 at a certain output value (hereinafter, reference value) and then, fluctuates the value at an amplitude value being vertically equal from the reference value as a center, and shifts phases of the waveforms of the signals indicating "0" and "1" by 180 degrees (as shown in FIG. 9A) so as to superimpose the relative slope signal and the absolute slope signal on the mensurative laser beam Lm. Accordingly, the relative slope signal and the absolute slope signal superimposed on the rotating mensurative laser beam Lm emitted from the rotary laser emitting apparatus 10 are so-called alternating current signals centered about the reference value. Accordingly, the calculating mechanism 61 is set so as to read out the superimposed relative slope signal and absolute slope signal from the signals of the light received from the light receiver 60, and then to perform a full-wave rectification on the light signals having the reference value as the center, as shown in FIG. 9B, so as to calculate the barycentric position based on the full-wave rectified value. Therefore, the barycentric position is calculated in the calculation mechanism 61 after making the signals indicating "0" and "1" have values larger than the reference value and be equal to each other. As a result, the barycentric position may be more precisely calculated under the same condition as that of signals of received light are received in a case where laser light having a constant or uniform intensity as rotating laser light emitted from the light receiving portion.

Here, in the rotary laser emitting apparatus 10 having such a structure, the rotation axis of the rotary body 12 deviates from the axis Ra when the rotary body 12 is rotated on the interior cylindrical portion 19. This is because the laser emitting section 41 is positioned at a position that deviates from the axis Ra in the rotary body 12, and the barycenter shifts with the rotation, and therefore, even if the supporting rigidity of the rotary body 12 on the interior cylindrical portion 19 is heightened, it is difficult to completely eliminate the deviations of the rotation attitude or position of the rotary body 12 on the axis Ra (on the interior cylindrical portion 19). When such deviations occur, the emitted direction of the mensurative laser beam Lm inclines with the deviations, and a precise survey may not be possible since the difference in elevation on the mensurative laser beam Lm is used for the survey as described above.

However, in the rotary laser emitting apparatus 10 of the present embodiment, even when deviations of the rotation attitude of the rotary body 12 from the axis Ra occur, the calculation mechanism 61 may modify the signals of the received light (the mensurative laser beam Lm) using the relative and absolute slope signals (may also modify the calculated result therefrom). The relative and absolute slope signals are superimposed on the mensurative laser beam Lm. Then the calculation mechanism 61 may calculate the angle of elevation between the point where the light receiver 60 is positioned and the given point where the rotary laser emitting apparatus 10 is positioned based on the mensurative laser beam Lm so that the precise survey may be performed.

In the rotary laser emitting apparatus 10 of the present embodiment, the following advantageous effects (1) to (13) may be obtained.

(1) Since the rotary body 12 is rotated on the interior cylindrical portion 19 (on the foundation 11) surrounding the supporting shaft portion 34 extending from the interior cylindrical portion 19 and since the mount portion 37 is positioned on top of the supporting shaft portion 34, the other survey apparatus (the wireless unit 38 in this embodiment) is stably supported on the containing section 42, that is, on top of the laser emitting section 41 contained therein, and also emits the laser light (the mensurative laser beam Lm) over the whole circumference around the axis Ra without any discontinuity.

(2) Since the relative slope signal is superimposed on the mensurative laser beam Lm, the survey accuracy is prevented from degrading due to the deviation of the rotation axis. This is because of the following reasons. The relative slope signal superimposed on the mensurative laser beam Lm is the signal detected by the slope sensor 48 as a slope of the base section 40 in relation to the interior cylindrical portion 19 at the time when the mensurative laser beam Lm is emitted, and is a relative slope of the rotary body 12 in relation to the foundation 11. Therefore, the relative slope signal indicates the slope in relation to the horizontal plane of the laser emitting section 41 contained in the rotary body 12, which is supposed to emit the rotating laser light in the direction orthogonal to the vertical axis Ra; that is, the relative slope signal indicates the slope in relation to the horizontal direction of the mensurative laser beam Lm which is expected to be horizontally emitted.

(3) Since the absolute slope signal is superimposed on the mensurative laser beam Lm, the survey accuracy is prevented from degrading due to the foundation 11 being sloped in relation to the horizontal direction when it is positioned on the given point. This is because of the following reasons. The absolute slope signal superimposed on the mensurative laser beam Lm is the signal detected by the pair of tilt sensors 32 as a slope on the horizontal surface of the foundation 11 at the time when the mensurative laser beam Lm is emitted and is a slope in relation to the vertical direction of the axis Ra which is supposed to be vertically directed. Therefore, the absolute slope signal indicates the slope of the laser emitting section 41 contained in the rotary body 12 in relation to the horizontal direction, which is supposed to emit the rotating laser light to the orthogonal direction to the axis Ra; that is, the absolute slope signal indicates the slope in relation to the horizontal direction of the mensurative laser beam Lm which is supposed to be horizontally emitted. Therefore, the calculation mechanism 61 modifies the three light signals received from the light receiver 60 based on the absolute slope signal, and precisely calculates the angle of elevation between the point where the light receiver 60 is positioned and the given point where the rotary laser emitting apparatus 10 is positioned. As a result, it is possible to precisely survey the surveying points by calculating the distance and the directionality between the given point and the point where the receiver is positioned. Here, in the rotary laser emitting apparatus 10 of the present embodiment, even though the automatic adjusting is made (adjusting so that no slope is detected by the pair of tilt sensors 32) by the automatic adjusting mechanism (the level adjusting mechanisms 22, the pair of tilt sensors 32, and the controlling section 20), it is difficult for the automatic adjusting mechanism to completely eliminate the small deviation caused by external factors such as wind or shake. Therefore, the points described in (3) are especially effective in a precise survey.

(4) Since the relative and the absolute slope signals are superimposed on the mensurative laser beam Lm by a Phase Shift Keying system, having the same integral value as each other for one period, the information on the mensurative laser beam Lm is appropriately obtained, and also, the information on the relative and the absolute slope signals are simultaneously transmitted. Therefore, by using the rotary laser emitting apparatus 10, it is possible to simultaneously obtain the information on the mensurative laser beam Lm and the information on the relative and the absolute slope signals by receiving the rotating mensurative laser beam Lm so that a more precise survey is possible.

(5) Since the relative and the absolute slope signals are superimposed as the so-called alternating current signals centered about the reference value on the mensurative laser beam Lm, a more precise barycentric position is calculated simultaneously whilst obtaining the relative and the absolute slope signals by calculating the barycentric position based on the full-wave-rectified value about the reference value as a center after reading out the superimposed relative and absolute slope signals by the calculation mechanism 61.

(6) A decline on survey accuracy caused by the deviated rotation axis is prevented only by placing the slope sensor 48 between the interior cylindrical portion 19 and the base section 40 and setting (updating) a control program (a control content) on the drive controlling section (the drive control board 53) so as to superimpose the relative slope signal detected by the slope sensor 48 on the mensurative laser beam Lm. Therefore, it is possible to prevent the apparatus from becoming large and complex.

(7) A decline on survey accuracy caused by the foundation being inclined in relation to the horizontal plane is prevented only by setting (updating) a control program (a control content) on the drive controlling section (the drive control board 53) so as to superimpose the absolute slope signal detected by a horizontal state detecting mechanism (the pair of tilt sensors 32 in the present embodiment) which has been generally mounted on the mensurative laser beam Lm. Therefore, it is possible to prevent the apparatus from becoming large and complex.

(8) The laser emitting section 41 can be a simple structure because it is enough to be able to form the irradiation ray Sa, the irradiation ray Sb, and the irradiation ray Sc, and to divide the laser light emitted from the LD 50 into three; therefore, the laser beam emitted from LD 50 may be efficiently used. Therefore, since the output of the emitted mensurative laser beam Lm can be enlarged, a measurable area can be broadened when a light receiver having the same performance as the conventional performance is used. Further, the same area as is conventionally measured can still be measured even when conversely a light receiver has a lower performance than is conventional, and therefore, an effective diameter of the used light receiver can be minimized, and downsizing of the light receiver is possible.

(9) Since the laser emitting section 41 is contained in the rotary body 12 rotated about the axis Ra, the measurement accuracy is prevented from varying (the accuracy of measuring the angle of elevation) depending on the emitted direction of the mensurative laser beam Lm (the angle in the rotating direction of the rotary body 12). This is because of the following reasons. Conventionally, when the laser emitting section provided on the foundation includes two or more pentaprisms stacked up on the axis and the laser light source of the laser emitting section which is configured to emit the laser light toward the pentaprisms along the axis, and when only the pentaprisms are rotated without rotation of the light source, effect of unevenness of the light amount of the laser light emitted from the laser source differs depending on the rotating emitting direction. Therefore, the measurement accuracy (the accuracy of measuring the angle of elevation) varies depending on the rotating emitting direction. In contrast, in the rotary laser emitting apparatus 10 of the present embodiment, the effect of unevenness of the light amount is constant regardless of the rotating emitting direction since the laser emitting section 41 including the LD 50 as the laser source is rotated about the axis Ra.

(10) In the laser emitting section 41, since the beam forming optical system 52 includes the three prism blocks 54*a*, 54*b*, and 54*c* all being parallel to the reference plane Bp and divides the incoming laser light after passing through the collimator lens 51 into three, it is possible to downsize the dimensions of the rotary body 12 in the direction of the axis Ra. Also, the three laser light beams having traveling directions which are in parallel to the reference plane Bp (the mensurative laser beams Lm) can be simultaneously emitted. Further, since the dimensions of the rotary body 12 in the direction of the axis Ra are downsized, it is possible to prevent shake from occurring in the rotation attitude or position of the rotary body 12 in relation to the axis Ra.

(11) In the containing section 42, the supporting shaft portion 34 extending from the interior cylindrical, portion 19 is led through the through-hole 42*c* under the circumstances where the base section 40 is rotatably supported on the interior cylindrical portion 19; and the upper portion of the supporting shaft portion 34 (the mount portion 37) extrudes from the upper wall portion 42*a*. Therefore, even when the containing section 42 is rotated on the interior cylindrical portion 19 with the base section 40, the mount portion 37 mounted on top of the supporting shaft portion 34 is not rotated with the containing section 42 (with the rotation body 12), and can stably support the other survey unit (a wireless unit 38 for this example) on top of the containing section 42, that is, the laser emitting section 41 contained therein.

(12) Since the relative and the absolute elope signals are superimposed by a Phase Shift Keying system on the mensurative laser beam Lm, even when the mensurative laser beam Lm is set to be an arbitrary frequency, the relative and the absolute slope signals are superimposed on the mensurative laser beam Lm without affecting the predetermined frequencies. Therefore, when two or more rotary laser emitting apparatuses are simultaneously used, it is possible to distinguish, by the frequencies of the received mensurative laser beam Lm, which apparatus emitted the mensurative laser beam Lm, and also to transmit the information on the mensurative laser beam Lm with the information on the relative and the absolute slope signals.

(13) Since the relative and the absolute slope signals are superimposed on the mensurative laser beam Lm, it is not necessary to temporally homologize the information between the mensurative laser beam Lm and the relative and the absolute slope signals, and therefore, with a simpler structure, a more precise survey can be achieved.

Accordingly, in the rotary laser emitting apparatus 10 of the present embodiment, a high measurement accuracy may be obtained even when the emitted direction of the laser light (the mensurative laser beam Lm) deviates from the axis Ra, which is emitted from the laser emitting section 41 positioned in the rotary body 12 circularly surrounding the axis Ra.

In addition, in the embodiment as described above, the relative slope signal (and the absolute slope signal) is transmitted to the light receiver 60 by being superimposed on the mensurative laser beam Lm. Here, the relative slope signal (and the absolute slope signal) may be separately transmitted, although this is not limited to the embodiment as described above.

Further, in the embodiment as described above, the absolute slope signal is superimposed on the mensurative laser beam Lm in addition to the relative slope signal. However, the absolute slope signal may not necessarily be superimposed (may not necessarily be in a form to be transmitted), and it is not limited to the embodiment as described above. However, in the embodiment as described above, when the relative slope signal and the absolute slope signal are superimposed on the mensurative laser beam Lm (transmitted), a more precise survey is achieved. Therefore, both of the relative slope signal and the absolute slope signal are preferably transmitted.

Furthermore, in the embodiment as described above, the relative slope signal and the absolute slope signal are superimposed by a Phase Shift Keying system on the mensurative laser beam Lm. However, it is enough to be able to superimpose the relative slope signal and the absolute slope signal on the mensurative laser beam Lm, and it is not limited to the embodiment as described above. However, the structure as described above is preferably used because if the relative slope signal and the absolute slope signal are superimposed by a Phase Shift Keying system on the mensurative laser beam Lm, the relative slope signal and the absolute slope signal can be superimposed on the mensurative laser beam Lm without affecting the predetermined frequencies even when the mensurative laser beams Lm are set to have arbitrary frequencies.

In the present embodiment as described above, although a structure is applied such that the relative slope signal and the absolute slope signal are superimposed by a Phase Shift Keying system on the mensurative laser beam Lm, it may be enough to have at least a transmitting section which transmits the information on the relative slope signal, and it is not limited to the embodiment as described above. For example, although not illustrated, it may be a structure having a wireless communication device as a transmitting section mounted on the rotary laser emitting apparatus and having the relative slope signal from the slope sensor being entered into the controlling section (the main board 20 or the drive control board 53 in the present embodiment) in the rotary laser emitting apparatus. Also, it may be a structure having the wireless communication device which may transmit the information on the relative slope signal under the control of the controlling section. In this case, in accordance with that the above, the wireless communication device may also be mounted on the light receiver, and it is necessary to have the structure such that the calculation mechanism of the light receiver modifies the received signal (the mensurative laser beam) (may also be the result of the calculation) based on the information on the relative slope signal which was emitted from the wireless communication device, when it calculates the angle of elevation between the point where the receiver is positioned and the given point where the rotary laser emitting apparatus is positioned. As a result, a precise survey can be achieved. Here, for performing a more precise survey, the wireless communication device as described above may also preferably transmit the information on the absolute slope signal.

By the rotary laser emitting apparatus of the present embodiment of the present invention, even when the attitude or position of the rotary body deviates from the axis, a highly accurate survey result may be obtained because the amount of deviation is informed as the relative slope signal from the transmitting section and the survey result obtained based on the laser light emitted from the laser emitting section is modified based on the relative slope signal. That is to say, it is possible for the rotary laser emitting apparatus to make a survey always have a certain high-level of accuracy no matter whether the attitude of the rotary body deviates from the axis or not.

In addition to the structure as described above, the transmitting section includes the laser source of the laser radiation section and the drive controlling section which controls the laser source. Supposing the drive controlling section controls the laser source in accordance with the relative slope signal so that the relative slope signal is superimposed on the laser light emitted from the laser emitting section by rotation of the rotary body, the transmitting section may consist only by updating the control content on the drive controlling section which controls the light source of the laser emitting section. Also, it is possible to prevent the apparatus from becoming large and complex. Further, regarding the light receiver which receives the emitted laser light, it may be enough to update the processing content on the calculation mechanism for processing the received signal, and therefore, it is possible to prevent the apparatus from becoming large and complex.

In addition to the structure as described above, supposing the relative slope signal is superimposed by the Phase Shift Keying system on the laser light, the receiver which receives the emitted laser light can appropriately detect the barycentric position on the signals of the received light and can simultaneously obtain the relative slope signal.

In addition to the structure as described above, the absolute slope detecting mechanism which detects the slope on the horizontal plane of the foundation is provided on the foundation. Supposing the transmitting section transmits the absolute slope signal detected by the absolute slope detecting mechanism along with the relative slope signal, the receiver which receives the emitted laser light obtains the slope on the horizontal plane of the foundation (the absolute slope signal) in addition to the amount of deviation of the attitude of the rotary body from the axis (the relative slope signal); therefore, a survey result having a higher accuracy is obtained based on the received laser light.

Supposing the survey system includes the rotary laser emitting apparatus, the receiver which receives the laser light emitted from the rotary laser emitting apparatus, and the calculation mechanism which calculates the angle of elevation between the point where the receiver is positioned and the point where the rotary laser emitting apparatus is positioned based on the signal received from the receiver, wherein the calculation mechanism calculates the barycentric position of the received signal after making the full-wave rectification on the received signal which was turned into the alternating current signal by having the relative slope signal superimposed onto, the calculation mechanism obtains the relative slope signal and the absolute slope signal; accordingly, the barycentric position is more precisely calculated.

In addition to the structure as described above, furthermore, the transmitting section may be a simple structure if a wireless communication device is included, and if the transmitting section transmits the relative slope signal by the wireless communication device. Further, the receiver which receives the emitted laser light may also be a simple structure since it may be enough to mount the wireless communication device on the receiver.

What is claimed is:

1. A rotary laser emitting apparatus comprising:
a rotary body;
a foundation configured to rotatably support the rotary body about an axis;
a laser light emitting section contained in the rotary body and configured to emit laser light in a direction orthogonal to a rotation axis of the rotary body;
a relative slope detecting mechanism configured to detect an amount of deviation of the rotation axis of the rotary body from the axis of the foundation as a relative slope signal;
an absolute slope detecting mechanism disposed in the foundation to detect a slope of the axis of the foundation in relation to a horizontal plane as an absolute slope signal; and
a transmitting section configured to transmit the relative slope signal detected by the relative slope detecting mechanism,
wherein the transmitting section is configured to transmit the absolute slope signal detected by the absolute slope detecting mechanism.

2. The rotary laser emitting apparatus according to claim 1, wherein
the relative slope detecting mechanism is disposed between the rotary body and the foundation.

3. The rotary laser emitting apparatus according to claim 1, wherein
the laser light emitting section has a laser light source.

4. The rotary laser emitting apparatus according to claim 3, wherein
the transmitting section includes the laser light source of the laser emitting section and a drive controlling section configured to control the laser light source in accordance with the relative slope signal so as to superimpose the relative slope signal on the laser light emitted from the laser emitting section while the rotary body is rotated.

5. The rotary laser emitting apparatus according to claim 4, wherein
a Phase Shift Keying system is configured to superimpose the relative slope signal on the laser light.

6. The rotary laser emitting apparatus according to claim 1, wherein
the transmitting section is configured to transmit the absolute slope signal detected by the absolute slope detecting mechanism simultaneously with the relative slope signal.

7. The rotary laser emitting apparatus according to claim 4, wherein
the transmitting section is configured to transmit the absolute slope signal detected by the absolute slope detecting mechanism simultaneously with the relative slope signal.

8. The rotary laser emitting apparatus according to claim 5, the transmitting section is configured to transmit the absolute slope signal detected by the absolute slope detecting mechanism simultaneously with the relative slope signal.

9. A survey system comprising:
a rotary laser emitting apparatus comprising
a rotary body,
a foundation configured to rotatably support the rotary body about an axis,
a laser light emitting section contained in the rotary body and configured to emit laser light in a direction orthogonal to a rotation axis of the rotary body,
a relative slope detecting mechanism configured to detect an amount of deviation of the rotation axis of the rotary body from the axis of the foundation as a relative slope signal, and
a transmitting section configured to transmit the relative slope signal detected by the relative slope detecting mechanism;
a receiver configured to receive the laser light emitted from the rotary laser emitting apparatus; and
a calculation mechanism configured to calculate an angle of elevation between a point where the receiver is positioned and a point where the rotary laser emitting apparatus is positioned based on a signal of the laser light received by the receiver, wherein
the transmitting section includes the laser light source of the laser emitting section and a drive controlling section configured to control the laser light source in accordance with the relative slope signal so as to superimpose the relative slope signal on the laser light emitted from the laser emitting section while the rotary body is rotated, wherein
the laser light emitting section has a laser light source, wherein
a Phase Shift Keying system is configured to superimpose the relative slope signal on the laser light, and wherein
the receiver is configured to receive an alternative current signal of the laser light on which the relative slope signal is superimposed; and
the calculation mechanism is configured to full-wave rectify the received alternative current signal of the laser light and to calculate a barycentric position of the rectified received signals.

10. A survey system comprising:
a rotary laser emitting apparatus comprising
a rotary body,
a foundation configured to rotatable support the rotary body about an axis,
a laser light emitting section contained in the rotary body and configured to emit laser light in a direction orthogonal to a rotation axis of the rotary body,
a relative slope detecting mechanism configured to detect an amount of deviation of the rotation axis of the rotary body from the axis of the foundation as a relative slope signal, and
a transmitting section configured to transmit the relative slope signal detected by the relative slope detecting mechanism;
a receiver configured to receive the laser light emitted from the rotary laser emitting apparatus; and
a calculation mechanism configured to calculate an angle of elevation between a point where the receiver is positioned and a point where the rotary laser emitting apparatus is positioned based on a signal of the laser light received by the receiver, wherein
the transmitting section includes the laser light source of the laser emitting section and a drive controlling section configured to control the laser light source in accordance with the relative slope signal so as to superimpose the relative slope signal on the laser light emitted from the laser emitting section while the rotary body is rotated, wherein
the laser light emitting section has a laser light source, and wherein
the receiver an alternative current signal of the laser light on which the relative slope signal is superimposed; and the calculation mechanism is configured to full-wave rectify the received alternative current signal of the laser light and to calculate a barycentric position of the rectified received signals.

11. A survey system comprising:

a rotary laser emitting apparatus comprising a rotary body, a foundation configured to rotatably support the rotary body about an axis, a laser light emitting section contained in the rotary body and configured to emit laser light in a direction orthogonal to a rotation axis of the rotary body, a relative slope detecting mechanism configured to detect an amount of deviation of the rotation axis of the rotary body from the axis of the foundation as a relative slope signal, and a transmitting section configured to transmit the relative slope signal detected by the relative slope detecting mechanism;

a receiver configured to receive the laser light emitted from the rotary laser emitting apparatus;

a calculation mechanism configured to calculate an angle of elevation between a point where the receiver is positioned and a point where the rotary laser emitting apparatus is positioned based on a signal of the laser light received by the receiver; and an absolute slope detecting mechanism disposed in the foundation to detect a slope of the axis of the foundation in relation to a horizontal plane as an absolute slope signal, wherein the transmitting section is configured to transmit the absolute slope signal detected by the absolute slope detecting mechanism simultaneously with the relative slope signal, and wherein the receiver an alternative current signal of the laser light on which the relative slope signal is superimposed; and the calculation mechanism is configured to full-wave rectify the received alternative current signal of the laser light and to calculate a barycentric position of the rectified received signals.

12. The rotary laser emitting apparatus according to claim 1, further comprising:

a wireless communication device; wherein the transmitting section is configured to transmit the relative slope signal by the wireless communication device.

13. The rotary laser emitting apparatus according to claim 1, wherein the absolute slope detecting mechanism is a pair of tilt sensors.

* * * * *